US012750284B2

(12) United States Patent
Kher

(10) Patent No.: US 12,750,284 B2
(45) Date of Patent: Sep. 29, 2026

(54) SITE STATUS ANALYSIS FOR 5G WIRELESS NETWORK

(71) Applicant: DISH Wireless L.L.C., Englewood, CO (US)

(72) Inventor: Pradipbhai Kher, Lewis Center, OH (US)

(73) Assignee: DISH Wireless L.L.C., Englewood, CO (US)

( * ) Notice: Subject to any disclaimer, the term of this patent is extended or adjusted under 35 U.S.C. 154(b) by 343 days.

(21) Appl. No.: 18/539,969

(22) Filed: Dec. 14, 2023

(65) Prior Publication Data

US 2025/0202777 A1 Jun. 19, 2025

(51) Int. Cl.

| | |
|---|---|
| ***H04L 41/16*** | (2022.01) |
| ***G06N 20/00*** | (2019.01) |
| ***G06Q 10/00*** | (2026.01) |
| ***H04L 41/22*** | (2022.01) |
| ***H04L 41/5009*** | (2022.01) |

(52) U.S. Cl.

CPC ............. *H04L 41/16* (2013.01); *G06N 20/00* (2019.01); *G06Q 10/00* (2013.01); *H04L 41/22* (2013.01); *H04L 41/5009* (2013.01)

(58) Field of Classification Search

CPC ................................ H04L 41/22; G06N 20/00

See application file for complete search history.

(56) References Cited

U.S. PATENT DOCUMENTS

| | | | | |
|---|---|---|---|---|
| 2022/0191706 | A1 * | 6/2022 | Gupta ................... | H04W 16/18 |
| 2025/0088946 | A1 * | 3/2025 | Grida Ben Yahya ... | H04L 41/16 |
| 2025/0322167 | A1 * | 10/2025 | Murthy .................. | G06F 40/40 |

* cited by examiner

*Primary Examiner* — Nicholas A Jensen
*Assistant Examiner* — Ryan Crigler
(74) *Attorney, Agent, or Firm* — KW Law, LLP

(57) ABSTRACT

Systems, devices, and automated processes are described to provide collection of wireless network status data, such as a 5G or other mobile network, and to automatically respond to queries regarding the status of the network. Systems and automated processes may obtain status data from a plurality of network components, for example a radio unit (RU), a distributed unit (DU), and a centralized unit (CU) associated with a cell site, ingest the obtained status data, including processing the status data with a machine learning model system, store the ingested status data in a data store, receive a user query related to the network, ingest the received user query using the MLM system, retrieve a result corresponding to the ingested query from the data store using the MLM system, generate, using the MLM system, a summary of the retrieved status data, and present the generated summary via a user interface.

20 Claims, 3 Drawing Sheets

SITE STATUS ANALYSIS FOR 5G WIRELESS NETWORK

TECHNICAL FIELD

The following generally relates to wireless data networks, such as 5G wireless networks. More particularly, the following relates to systems, devices, and automated processes to monitor network status and provide status summaries in response to queries.

BACKGROUND

Wireless networks that transport digital data and telephone calls are becoming increasingly sophisticated. Currently, fifth generation ("5G") broadband cellular networks are being deployed around the world. These 5G networks use emerging technologies to support data and voice communications with millions, if not billions, of mobile phones, computers, and other devices. 5G technologies are capable of supplying much greater bandwidth than was previously available, so it is likely that the widespread deployment of 5G networks could radically expand the number of services available to customers.

Traditionally, data and telephone networks relied upon proprietary designs based upon very specialized hardware and dedicated point-to-point data connections. More recently, industry standards such as the Open Radio Access Network ("Open RAN" or "O-RAN") standard have been developed to describe interactions between the network and various client devices. The O-RAN model follows a virtualized wireless architecture in which 5G base stations ("gNBs") are implemented using separate centralized units (CUs), distributed units (DUs) and radio units (RUs), along with various control planes that provide additional network functions (e.g., 5G Core, IMS, OSS/BSS/IT). Generally speaking, it is still necessary to implement the RUs with physical transmitters, antennas, routers, and other hardware located onsite within broadcast range of the end user's device.

Other components of the network, however, can be implemented using a more centralized architecture based upon cloud-based computing resources, such as those available from Amazon Web Services (AWS) or the like. This provides much better network management, scalability, reliability and redundancy, as well as other benefits. O-RAN CUs, DUs, control planes and/or other components of the network can now be implemented as software modules executed by distributed (e.g., "cloud") computing hardware. Other network functions such as access control, message routing, security, billing and the like can similarly be implemented using centralized cloud computing resources. Often, a CU, DU, control plane or other image is created in software for execution by one or more virtual computers operating in parallel within the cloud environment. The many virtual servers can be very rapidly scaled to increase or decrease the available computing capacity as needed.

The use of virtualized hardware provides numerous benefits in terms of rapid deployment and scalability, but it also presents certain technical challenges that have not been encountered in more traditional wireless networks. Unlike traditional wireless networks that scaled through the addition of physical routers, switches and other hardware, RAN networks can scale upwardly and downwardly very quickly as new cloud-based services are deployed and/or existing services are retired or redeployed. Additional network components can be very quickly deployed, for example, through the use of virtual components executing in a cloud environment that can be very quickly duplicated and spawned as needed to support increased demand. Similarly, virtual components can be de-commissioned very quickly with very little cost or effort when network capacity allows. The virtual components provide substantial efficiencies, especially when compared to prior networks that were based upon complex interconnections between geographically dispersed routers, servers and the like.

The flexibility and rapid variability of such networks leads to a large (but possibly constantly changing) amount of available status data corresponding to the operation of the various network components, the network as a whole, and the like. Maintaining an up-to-date summary of network status, for example a report including predefined fields, becomes difficult with the amount of available data and its changeability. Given the complexity of such networks, such statically-defined summaries can rapidly become out of date or otherwise inaccurate, leading to missed opportunities to correct network behavior, quickly fix cell site issues, and the like. High availability is required for each cell site and the network to minimize data and voice service interruptions, so it is desirable to more accurately determine the status of the network in response to customizable status queries.

One technical challenge that arises in the new networks, therefore, involves monitoring the status, performance, and connectivity of the networks. Network components can be commissioned and de-commissioned very rapidly, and conditions can evolve very quickly in various parts of the network. Tracking the performance, status, and connectivity of a large-scale RAN network can therefore be very difficult due to the scale of resources involved and the dynamic nature of such networks.

As new networks are developed and deployed, then, substantial challenges arise in tracking the performance and connectivity of the network and its many distributed components. A substantial desire therefore exists to build systems, devices and automated processes that allow for monitoring and control of emerging 5G wireless networks. These and other features are described in increasing detail below.

BRIEF SUMMARY

Various embodiments relate to systems, devices, and automated processes to provide status data management and provide summaries of obtained status data, for example in response to a user query, automated query, and the like. According to various embodiments, systems and automated processes may automatically collect various status data, process it using a machine learning model system, for example including an embedding model and a large language model, store the obtained status data and processed status data, receive and process a query using the machine learning model system, and determine a response based on the query and the stored data using the machine learning model system. The systems and automated processes may provide dashboards, reports, alerts, or other information about the state of the network, one or more cell sites, or the like.

In various embodiments, an automated process may be performed by a data management system associated with a wireless network having a plurality of network components associated with a plurality of cell sites, the data management system comprising a processor and an interface to the wireless network, the automated process comprising: obtaining, via the network interface, a plurality of status data from the plurality of network components, wherein the plurality of network components comprises at least one each of a radio unit (RU), a distributed unit (DU), and a centralized unit (CU) associated with at least one of the plurality of cell sites; ingesting the obtained status data, comprising processing the obtained status data with a machine learning model (MLM) system, wherein the MLM system comprises a MLM; storing the ingested status data in a data store; receiving, via a user interface of the data management system, a user query related to the network; ingesting the received user query using the MLM system; retrieving a status data result corresponding to the ingested query from the data store using the MLM system; generating, using the MLM system, a summary of the retrieved status data result; and presenting the generated summary via the user interface.

Still other embodiments provide a data management system comprising a processor, non-transitory storage, and an interface to a wireless network having a plurality of network components associated with a plurality of cell sites, wherein the non-transitory storage comprises computer-executable instructions that, when executed by the processor, perform an automated process that comprises: obtaining, via the network interface, a plurality of status data from the plurality of network components, wherein the plurality of network components comprises at least one each of a radio unit (RU), a distributed unit (DU), and a centralized unit (CU) associated with at least one of the plurality of cell sites; ingesting the obtained status data, comprising processing the obtained status data with a machine learning model (MLM) system, wherein the MLM system comprises a MLM; storing the ingested status data in a data store; receiving, via a user interface of the data management system, a user query related to the network; ingesting the received user query using the MLM system; retrieving a status data result corresponding to the ingested query from the data store using the MLM system; generating, using the MLM system, a summary of the retrieved status data result; and presenting the generated summary via the user interface.

Still other embodiments provide An automated process performed by a data management system associated with a wireless network having a plurality of network components associated with one or more cell sites, the data management system comprising a processor and an interface to the wireless network, the automated process comprising: periodically obtaining, via the network interface, a plurality of status data from a subset of the plurality of network components; ingesting the obtained status data, comprising processing the obtained status data with a machine learning model (MLM) system, wherein the MLM system comprises a MLM; storing the ingested status data in a data store; receiving an automated query related to the network; ingesting the received automated query using the MLM system; retrieving a status data result corresponding to the ingested automated query from the data store using the MLM system; generating, using the MLM system, a summary of the retrieved status data result; and storing the generated summary in a second database.

These and other example embodiments are described in increasing detail below.

BRIEF DESCRIPTION OF DRAWING FIGURES

DETAILED DESCRIPTION

Figure 1:
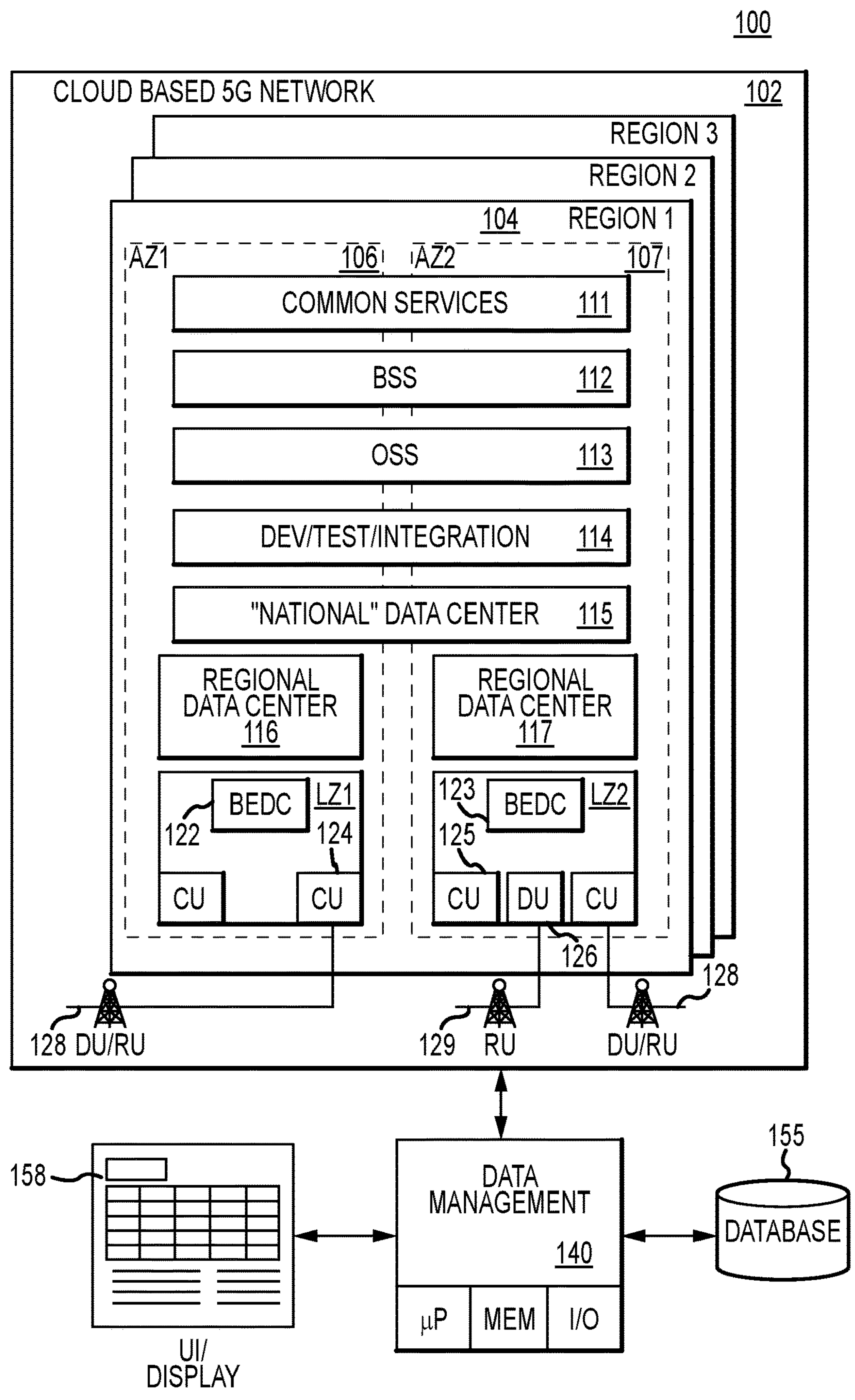
FIG. 1 shows an example of a 5G wireless network that is implemented with a cloud-based computing system.

The following detailed description is intended to provide several examples that will illustrate the broader concepts that are set forth herein, but it is not intended to limit the invention or the application and uses of the invention. Furthermore, there is no intention to be bound by any theory presented in the preceding background or the following detailed description.

According to various embodiments, a data management system obtains operating or other performance data relating to the various modules of a RAN-based mobile network system. The data management system can be configured to receive streaming data that may be available from one or more data sources. Alternately and/or additionally, the data management system can place queries to other sources of data. Data received via query and/or streams can be filtered, formatted, tagged with metadata and/or otherwise processed into a format suitable for processing by the data management system. The data management system may process the received data using one or more machine learning models, and may store the process and unprocessed data for later user. The data management system may access the stored data in response to a query (by a user, automated, etc.), for example using another machine learning model to summarize the data in response to the query. The data management system may additionally create dashboard or other reports for evaluation by humans and/or by other automated processes based upon the processed data.

Using a data management system accordingly allows for real time (or near real-time, accounting for some delays inherent in processing, data communications and the like) monitoring and control of a 5G wireless network in a manner that was not previously thought to be possible. The use of a data management system also provides for rapid adaptation to dynamic cloud-based systems, providing flexibility with accuracy in the summaries produced by the data management system, and providing faster responses and thereby allowing reduction in operating costs of the network.

The automated processes and systems may leverage information available from a virtualized network management system such as an operational support system (OSS), element management system (EMS), and the like. Use of the automated processes and systems described herein allows for real time (or near real time) monitoring of the status of the health of the network, each of plurality of cell sites of the network, other network components, and the like in a manner not previously possible. Use of the automated processes and systems described herein further allows for detailed, configurable, customizable, and interactive reports corresponding to network-related issues in a manner not previously possible. The use of the status summary systems and methods allows deeper insights into the network and cell site status, for a more complete view and efficient identification, analysis, and correction of issues in the network. The status summary systems and methods described herein result in higher network uptime and facilitate meeting quality of service and other goals.

With reference to FIG. 1, a 5G wireless network 102 can be implemented using cloud-based computing resources, such as those available from Amazon Web Services Inc.

(AWS) of Seattle, Washington. Other cloud services are available from Microsoft Corp. of Redmond, Washington, IBM Corp. of Armonk, New York, and others. In the example of FIG. 1, network 102 encompasses data processing services supporting multiple regions 104, each having one or more availability zones (AZs) 106, 107 each acting as a separate data center with its own redundant power, network connectivity and other resources as desired. In some implementations, the various AZs operating within the same region will provide redundancy in the event that another AZ would fail, become overloaded, or otherwise become unavailable.

The example of FIG. 1 illustrates three regions, with region 104 having two AZs 106, 107, although other embodiments could include any number of regions and AZs providing any number of services and resources. The regions and zones are often described herein with reference to geographic locations, but in practice the regions and zones could be equivalently organized based upon customer density, user density, expected network demand, availability of electric power and/or bandwidth, and/or any other factors. As noted above, it will still be necessary to deploy radio units (RUs) within broadcast range of end users. By implementing the other functions of the network using virtualized hardware operating within a cloud-type architecture, geographic restrictions upon the network 102 can be greatly reduced. This can provide substantial efficiencies in deployment and expansion of network 102, while also allowing for more efficient use of computing resources, data storage and electric power. However, particular arrangements, operational parameters, and performance requirements of each cell site and the various components of the network 102 might be required to support such efficiencies.

In example system 100, a network operator maintains ownership of one or more radio units (RUs) located at wireless network cell sites 128, 129. Each RU suitably communicates with user equipment (UE) operating within a geographic area of its respective cell site using one or more antennas/towers capable of transmitting and receiving messages within an assigned spectrum of electromagnetic bandwidth (which may also be referred to herein as a "spectrum band" or "frequency band"). In various embodiments, the assigned spectrum may be allocated across one or more guest networks to support multiple concurrent networks, if desired.

The Open RAN standard breaks communications into three main domains: the radio unit (RU) that handles radio frequency (RF) and lower physical layer functions of the radio protocol stack, including beamforming; the distributed unit (DU) that handles higher physical access layer, media access (MAC) layer and radio link control (RLC) functions; and the centralized unit (CU) that performs higher level functions, including quality of service (QOS) routing and the like. The CU also supports packet data convergence protocol (PDCP), service data adaptation protocol (SDAP) and radio resource controller (RRC) functions. The RU, DU and CU functions are described in more detail in the Open RAN standards, as updated from time to time, and may be modified as desired to implement the various functions and features described herein.

In the example illustrated in FIG. 1, common services (e.g., billing, guest network allocation, etc.) can be performed in a shared service 111 across the available AZs 106, 107. Typically, these shared services will be implemented within a common virtual private cloud (VPC) operating within the cloud environment. Similarly, shared VPC systems can support business support system (BSS) 112, operational support services (also referred to as operating support system or OSS) 113, development/test/integration features 114, and/or the like across the entire region. A region wide data center (identified as a "national" data center 115 in FIG. 1) could be implemented in a shared VPC across AZs 106, 107, if desired, with subordinate data centers (e.g., "regional" data centers 116, 117) being separated into different VPCs for each of the AZs 106, 107. Additional levels of data centers could be provided, if desired, and/or the different data center functions could be differently organized in any number of equivalent embodiments. The various data centers could provide any number of services such as IP multimedia services (IMS), 5G core services and/or the like.

In the example of FIG. 1, each AZ 106, 107 includes one or more breakout edge data centers (BEDCs) 122, 123 each supporting a local zone (LZ, such as LZ1 or LZ2 in FIG. 1) with one or more cell sites. The BEDCs are ideally organized for very low latency to provide best possible throughput and low latency to the various user equipment operating within the local zone. BEDCs 122, 123 will typically implement one or more CUs 124, 125 in accordance with the O-RAN specifications. BEDCs may also implement user plane functions that handle user data sessions for gaming, streaming and other network services, as desired. Again, any number of BEDCs and other data centers may be implemented using any number of different or shared VPCs in the cloud environment, as desired. The DUs 126 may be provided physically at the cell site 128, 129 or may be remote from the cell site, for example provided by the local zone (e.g., LZ1, LZ2), or any combination thereof depending on each cell site 128, 129. Accordingly, the DU may comprise physical hardware located at a cell site 128, 129 or remote from a cell site, or may comprise virtualized resources as described above.

As noted above, many of the various network components shown in FIG. 1 can be implemented using software or firmware instructions that are stored in a non-transitory data storage (e.g., a disk drive or solid-state memory) for execution by one or more processors within the VPC. VPCs may provide any number of additional features to support the data handling functions of the system, including redundancy, scalability, backup, key management, reporting, and/or the like.

In some embodiments, the OSS 113 may comprise or otherwise be in communication with an element management system (EMS) configured to manage the network elements (or components) of the system 100. In some embodiments, the EMS can manage a network component or a group of similar network components, for example configuring, reading alarms, obtaining status and other reported information, or the like for a group of network components. For example, the EMS may implement fault, configuration, accounting, performance, and/or security functions. The EMS may interface with the OSS 113, for example to manage inventory, faults, and configuration. The OSS 113 may interface with one or more EMSs. The EMS may also interface with the various components of the network, for example to manage and/or configure DUs and RUs. The EMS and OSS 113 therefore support deployment of new services, monitoring performance and faults, and meeting quality of service requirements, among other functions. The EMS and OSS may collectively be referred to herein as the OSS 113. In embodiments without a dedicated EMS, the OSS 113 or other similar management programs may perform the functions described above, which again shall be referred to as OSS 113 herein.

Each RU of a cell site 128, 129 may be associated with a different wireless cell that provides wireless data communications to any number of user devices operating within broadcast range of the cell. For example, a cell site 128, 129 may have antennas arranged to serve three sectors of 120-degree coverage each (e.g., one sector per cell), six sectors of 60 degrees each, or any other suitable arrangement, with each such antenna communicatively coupled with an RU for that sector or cell. Each sector may form separate pie-shaped arcs that, combined, form a circle of 360-degree coverage around the cell site. Each sector may be part of a separate cell (e.g., as is common in a three-sector configuration), or multiple sectors may share the same cell (depending on cell site configuration).

As described above, 5G networks such as network 102 may be continually and rapidly expanding and evolving, and a large number of cell sites may require initial setup and ongoing maintenance. Setting up and maintaining numerous cell sites may be facilitated by standardizing or otherwise prescribing how the cell sites are to be set up. For example, a particular cell site or type of cell site may have a predetermined configuration including number and model of RUs, cell cite routers (CSRs), antennas, and the like, and may include how such components are to be communicatively coupled. Further, the configuration may assign each RU (e.g., identified by serial number, MAC address, or the like) to a specific sector, spectrum band(s), port connection on the CSR, IP address, and the like.

An RU may transmit, receive, amplify, and digitize radio frequency signals, and may be integrated with one or more antennas or may be separate from but communicatively coupled with one or more antennas of the cell site. RUs may be implemented with radios, filters, amplifiers and other telecommunications hardware to transmit and receive digital data streams via one or more antennas. Generally, RU hardware includes one or more processors, non-transitory data storage (e.g., a hard drive or solid-state memory) and appropriate interfaces to perform the various functions described herein. RUs are physically located on-site with the transmitter/antenna, as appropriate. Conventional 5G networks may make use of any number of wireless cells spread across any geographic area, each supported by an on-site RU. In some embodiments, the cell site comprises one RU per sector, and if the cell site is multi-band then it may comprise one RU per band per sector.

User devices are often mobile phones or other portable devices that can move between different cells associated with the different RUs, although 5G networks are also widely expected to support home and office computing, industrial computing, robotics, Internet-of-Things (IoT) and many other devices. Therefore, many configurations, operational requirements, performance metrics, and the like may be required. While the example illustrated in FIG. 1 shows just a few cell sites 128, 129 for convenience, a practical implementation will typically have any number of cell sites that can each be individually configured, including the RUs at the cell sites, to provide highly configurable geographic coverage for the 5G network 102. Further, the cell sites 128, 129 can be configured for any combination of spectrum bands. For 5G networks, the low band (LB) spectrum may comprise frequencies less than 1 GHz, the mid band (MB) spectrum may comprise frequencies from 1 GHz to 6 GHZ, and the high band (HB) may comprise frequencies from 24 GHz to 40 GHz. For example, some cell sites may operate at a single spectrum band, and some cell sites may operate at multiple bands ("multi-band") such as LB and MB. The respective RUs and antennas may be configured to support the assigned spectrum band(s).

Figure 2A:
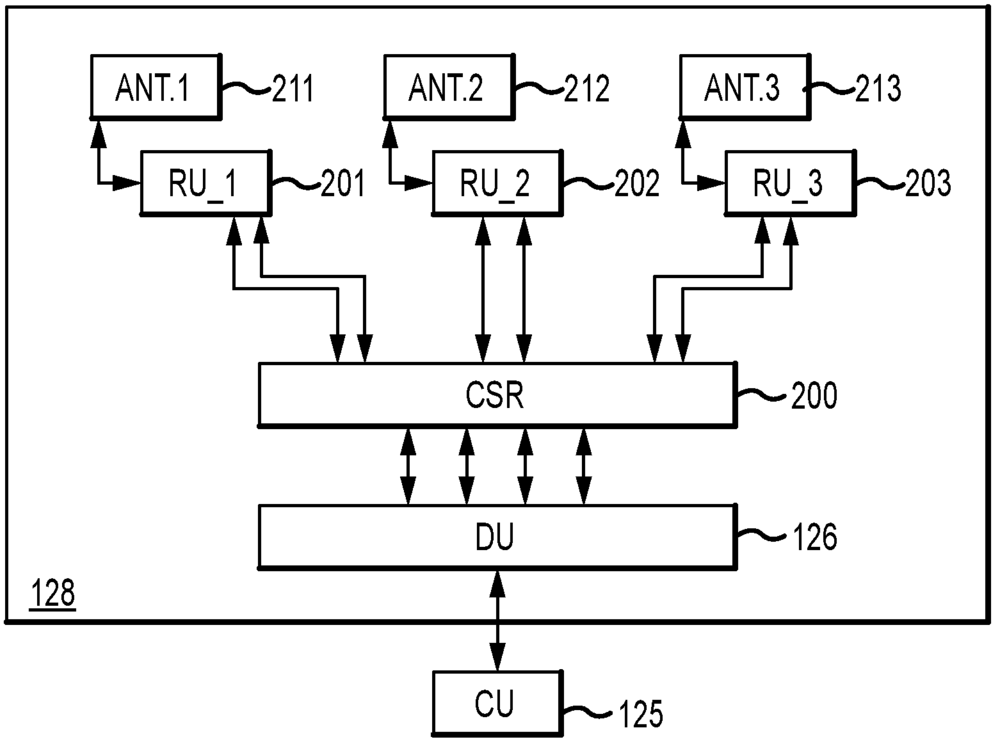
FIG. 2A is a block diagram illustrating a first exemplary arrangement of components associated with a cell site of the 5G wireless network.
Figure 2B:
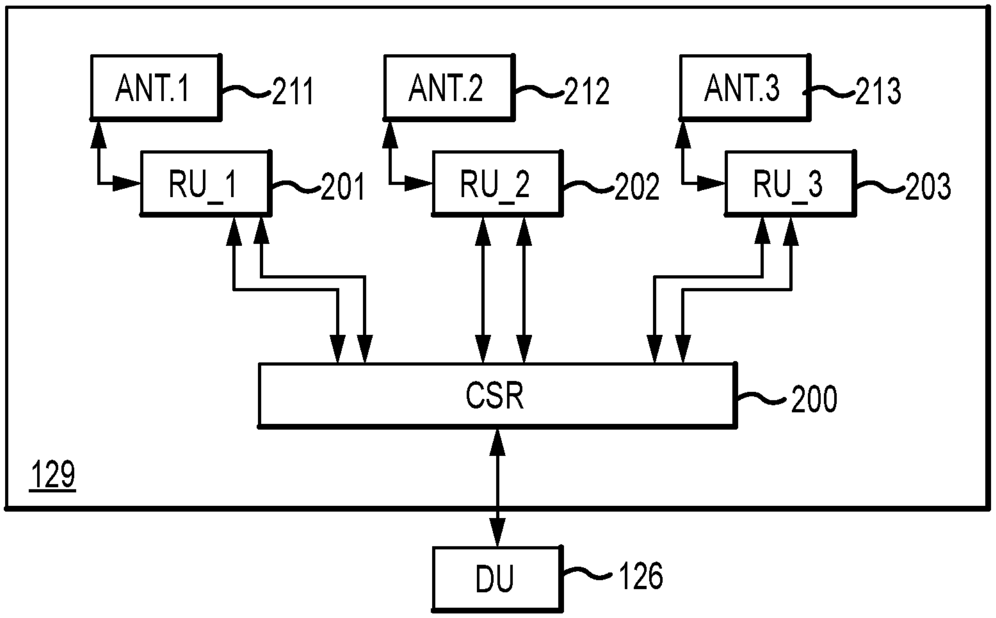
FIG. 2B is a block diagram illustrating a second exemplary arrangement of components associated with a cell site.

Briefly referring to FIGS. 2A and 2B, cell sites 128, 129 may be configured in a number of suitable arrangements. Referring to FIG. 2A, for example, a cell site 128 may comprise a cell site router (CSR) 200, a DU 126, one or more RUs 201, 202, 203, and one or more antennas 211, 212, 213. Each RU 201, 202, 203 may be electrically coupled with antennas 211, 212, 213, respectively. Each connected group of RU and antenna may serve a cell sector. For example, a first RU 201 coupled with a first antenna 211 may serve a first sector, a second RU 202 coupled with a second antenna 212 may serve a second sector, and a third RU 203 coupled with a third antenna 213 may serve a third sector. Further, each such RU-antenna group may serve the respective sector in one or more spectrum bands, e.g., LB, MB, HB, or any combination thereof. Specific RUs 201, 202, 203 (e.g., identified by serial number, MAC address, RU label, or the like) and specific antenna types (e.g., identified by model number) may be assigned to specific sectors and spectrum bands.

The RU 201, 202, 203, CSR 200, and in some cases the DU 126 may be in a local area network (LAN) configuration. The LAN configuration may comprise, for example, an Ethernet-based network, and may comprise wired connections, fiber optic connections, and/or the like between the various components. The CSR 200 may have input/output connections (e.g., ports) for multiple RUs 201, 202, 203 and one or more DU 126.

The CSR 200 may function as a network router and may aggregate the cell data traffic from the cell site 128, 129 and transmit the aggregated data to the network 102, for example via the DU 126. The CSR 200 may be communicatively coupled with the one or more RUs 201, 202, 203 and one or more CUs 125 via the CSR 200 ports. The CSR 200 can associate each port with an IP address, MAC address, and other desired information.

The network 102, for example the data management system 140, may access the CSR 200 to obtain this information. In some embodiments, the data management system 140 may send an instruction to the CSR 200 to request information about the current state of the interface (e.g., ports) of the CSR 200. The CSR may reply with information regarding each port and connected devices, including port identifiers, IP addresses, status, and the like. The network 102, for example the data management system 140, may similarly access each RU 201, 202, 203, for example via the CSR 200, to obtain relevant information. In various embodiments, the RUs 201, 202, 203, DU 126, CSR 200, and data management system 140 are communicatively coupled (e.g., via hardware or software interface) with the OSS 113.

Each DU 126 may support multiple cells or cell sites, and the CSR 200 may be communicatively coupled with one or more DUs 125. In some embodiments, referring still to FIG. 2A, the DU 126 may be located at the cell site 128. Referring to FIG. 2B, in another example, the DU 126 may be located external to the cell site 129, for example implemented via cloud computing, for example at a local zone, with the connections between DU 126, CSR 200, RUS 201, 202, 203, and antennas 211, 212, 213 being as described above.

Referring again to FIG. 1, in various embodiments the information (e.g., status data) obtained by the data management system 140 from the RUs 201, 202, 203, DU 126, CU 125, CSR 200, OSS 113, and/or other network components, is at least temporarily stored in a database 155 or other storage available to data management system 140 for subsequent processing. The data can also be formatted, as desired, so that data received from different sources can be collectively processed and used in the determination and reporting functions described below. Generally speaking, some embodiments will place received data into a relatively consistent format that can be analyzed and processed by the data management system 140 to permit dashboards, alerts, and reports (each of which may be represented in FIG. 1 by the UI/display 158) to be generated by a common system from different types of data that have been collected about the network 102. The data management system 140, as described in more detail below, may store processed status data in the database 155.

In various embodiments, the data received from the various data sources is automatically tagged with metadata or other information about the data source, the method of collection, dates and/or times of collection, and/or any other information that may be desired. The tagging and metadata may also be considered status data. Tagging may be performed by associating the data values with other relevant information within an extensible markup language (XML) structure, a JavaScript object notation (JSON) structure and/or any other format desired. Reports may be generated in response to queries received via an API, web browser interface or other user interface, for example via the UI/display 158, or the like, as desired. Dashboards may be generated for real time presentation to monitor current status of the network 102 and/or its components.

It is generally desired to monitor the status of the network 102. As noted above, the various components of the network 102 can be implemented using virtual private clouds (VPC) or other virtual hardware components, dedicated hardware, or configured general purpose hardware, among others. Each of these components will typically produce data during operation that indicates status, performance, capacity, issues and/or any number of other parameters. The many individual network components, for example RUs, antennas, cell site routers (CSRs), DUs, and CUs, may provide status, identification (e.g., serial number, MAC address, associated cell site, etc.), configuration, performance, capacity, and/or any number of other parameters (collectively, including from the VPCs, referred to herein as status data). Status data may be queried, streamed, or otherwise obtained from the network 102, and may be live data, raw data, formatted or unformatted, or the like. Status data may further include information required for sleepy cell detection, the output of such sleepy cell detection, key performance indicators (KPI) such as those defined for 5G networks, and the like. The defined KPIs can, for example, be measured at different locations within the network.

In some cases, it is necessary to monitor over 150, and in some cases multiple hundreds or thousands, of status data fields, to determine and monitor the operational condition of the network 102 and identify any issues with the network 102. The large amount of data produced by the various modules and components can be processed to generate dashboards, alerts, notifications, and/or other reports 158 that may be viewed and interacted with by an operator. The large amount of data can be processed to support user queries regarding the status of various aspects or components of the network 102. Status data can also be used to adjust the configuration or operation of the network, as desired. By processing and managing data produced by and/or corresponding to the various components of network 102, then, the status and performance of the network can be monitored, adjusted, and corrected as desired.

In some embodiments, status data may include information provided with health checks (HC) sent by or requested from the RUs, DUs 126, CUs 124, 125, and/or the like. For example, health check information may include specific items such as N3 ping status, pod status, el_ap_status, sctp_status, tx/rx power, flc status, vm status, prach status, cell admin/operational status, and the like. Health check information may be specific to a particular vendor of the relevant equipment and/or operating environment (whether hardware or software), the type or model number of such equipment and/or environment, a particular configuration of such equipment and/or environment, or the like. In some embodiments, status data may include information provided by the CSR (e.g., from an interface status request), by the systems operating the region(s) 104, availability zone(s) AZ1, AZ2, data centers 115, 116, 117, BEDCs 122, 123, local zones LZ1, LZ2, and the like.

In some embodiments, status data may include KPIs. Such status data may include data specific to a particular network 102 component, may include data corresponding to a group of components (e.g., delay and latency between two or more components, etc.), may include data corresponding to the network as a whole, and the like. KPIs may include a variety of performance indicators, for example latency, jitter, availability, packet loss, area capacity, user data rate, component onboarding, configuration, and deployment times, slice creation time, component scaling time, signal/noise data, and many others. KPIs may include data accessibility and retainability, handover success, rrc connection reestablishment, VONR accessibility and retainability, and/or other measures of user experience on the network 102. KPIs may be obtained from a variety of sources, for example depending on the vendor of the particular equipment and/or virtualized operating environment of the network 102. For example, KPIs may be provided by the OSS 113, by a separate tool provided by a vendor of the OSS 113, other system of the network 102, and the like. KPIs may be vendor and/or standard specific.

In some embodiments, status data may include other parameters and various types of electronic documents. For example, status data may include site closeout package documentation corresponding to a completed cell site, including for example floor plans, component settings at time of install, test results from installation, equipment list, serial numbers, software/hardware revisions, power up data, GPS data, antenna setup details, other configuration information, and the like. Documentation may be in any suitable format, for example Portable Document Format, text file, comma-separated value list, HTML, XML, and the like.

The parameters may be separate from the HC, KPIs, and electronic documentation, and may comprise network configurations that tell a UE and a cell site how to behave, when to handover, if the site is not allowed for commercial use, max power, when to do carrier aggregation, when to reselect to a new cell, how long to wait before triggering certain events, where to send random access requests (in terms of frequency and time resources, etc.), and so on. Parameters may be vendor and/or standard specific, and some specific examples of parameters may include rsrp (for example eventa3), hysteresis, qrxlevel Minimum, qRxLevMinOffsetCell, prachPreamble format, timetotrigger (for example eventa3 and a5), sNonintra search threshold (i.e., inter frequency measurement threshold), cell reselection priority, cellbar state, cell reservation state, and so on. There can be thousands of parameters controlling the behavior of a cell site, the network, and the UE.

In various embodiments, a data management system 140 may be provided to collect and ingest (e.g., process) raw or processed status data from one or more of the components of network 102, for example from the RUs, DUs 126, CUs 124, 125, OSS 113, and CSRs. Data may be obtained by querying the components, receiving a data stream from the components (e.g., in real-time or near real-time), or any other suitable method or combination of methods. In some embodiments, the data management system 140 may obtain status data for the network 102 components indirectly, for example via a support system such as the OSS 113, BSS 112, or other data collection/aggregation systems and/or processes. In some embodiments, the data management system 140 may obtain status data related to UE devices, for example directly from UE devices and/or derived from communication between the UE devices and the network 102, or otherwise provided by the UE to the network 102. The data management system 140 may obtain relevant status data from other suitable sources internal or external to the network 102.

Any number of streaming and/or query-based data sources may be deployed within the network 102. Streaming data may be particularly useful for network 102 components that generate substantial amounts of real-time data (e.g., performance measurements, etc.). For example, DU and CU modules of network 102, in particular, provide substantial amounts of real-time data. Generally speaking, data handled by query-based sources tend to be less reliant upon real-time delivery for status updates or the like. Log data, fault metrics, performance metrics and other types of time-series data may be particularly well-suited for query-type collection.

The data management system 140 may be implemented using any sort of computing hardware, such as any sort of processor (μP), memory or other non-transitory data storage and input/output (I/O) interfaces for data communications and/or the like. The data management system 140 may comprise an interface (e.g., I/O) to the network 102, for example via wired or wireless networking, application programming interface (API) calls within a software operating environment, virtualized connections, or the like, by which it can collect the various data from the network 102 as described herein. The data management system 140 may comprise an interface external to the network 102, for example to collect status data relevant to the network 102 but from external to the network 102 (e.g., map data, UE device information, weather information, or the like). In various embodiments, hardware is abstracted by virtual computing resources available from AWS or another cloud computing platform.

In some embodiments, the data management system 140 may be implemented via program instructions configured to run on a computing device (implemented with conventional hardware, virtualized hardware, and/or cloud-based resources as desired) such as a computer server that queries the monitored components according to any desired time schedule to receive data, queries the monitored components on demand, receives data stream from the monitored components, or the like. The data received by the data management system 140 may be locally cached or otherwise stored in any sort of non-transitory memory (e.g., solid state memory, magnetic or optical memory, cloud-based sources, and/or the like) for subsequent retrieval and processing as desired and as described herein. Each monitored component may be internally configured to write its output/log data to data management system 140, as desired.

The data management system 140 may communicate with the monitored components directly and/or through one or more intermediary components or data sources to obtain the desired data. The data management system 140 may format and/or filter the obtained data as appropriate, and forward and/or store the collected and possibly processed data for reporting and/or any other further processing as desired. In various embodiments, the data management system 140 may receive data in one or more formats, may append source and/or service location (e.g., cell site, sector, spectrum band) information as tags or the like, and may push and/or store the tagged data for further processing, display, or the like (using, e.g., HTTP structures or the like). In some embodiments, the data management system 140 may process, format, and/or forward the obtained data for presentation via a dashboard 158, response to a query, web interface, alert system, and the like. Some embodiments may also filter the received data as desired to remove unwanted or unnecessary data that would otherwise consume excess storage or require additional processing. Other embodiments may perform additional monitoring, as needed.

In some embodiments, for example, the data management system 140 may obtain status data from the OSS 113, for example collecting, for each RU at a cell site, an assigned site and sector identifier, a serial number, administrative state, operational state, cell state, a label for the RU (e.g., identifying the cell site, spectrum band, and sector the RU is intended to cover), IP address, tilt and other configuration and identifying information (e.g., serial number) for an antenna to be coupled with the RU, other identifying or model information for the RU, coupled antennas, or cell site, and the like. Similar or other status data may be obtained for the DU, CU, CSR, or any other network 102 component or related device (e.g., UE), and may be stored by the data management system 140.

In various embodiments, the data management system 140 stores received data in a database 155 or other data structure for later retrieval, as desired. The data management system 140 can process the status data as described herein and store the processed data in the database 155. The database 155 may comprise any suitable data store, for example a relational database, vector database (also referred to as a vector store), graph database, unstructured database, spreadsheet, combination of database types, or the like. The database 155 may comprise an embedded knowledge base, for example embedded according to a machine learning model. The knowledge base may be created and updated according to status data.

The data management system 140 may also provide reports to human and/or automated reviewers. One or more dashboards may be presented on any display 158, for example comprising a user interface (UI). The display 158, for example via a suitable user interface, may also receive data and queries from a user. Reports can be used to monitor the status of network 102, to determine the configuration or operation of network 102 (or any component thereof), and/or for any other purpose. The data management system 140 may further provide real-time alerts (e.g., via email, text message or the like) to human operators if certain events are detected, such as outages, shutdowns, security breaches and/or the like. Other embodiments could implement the various functions and components described herein in any number of equivalent arrangements.

In operation, then, data management system 140 suitably obtains status data from or related to one or more components of a 5G wireless network operating within a cloud-based computing environment. The data can be obtained directly from the component, via intervening data source systems that aggregate data from multiple data sources within the network 102, or the like. Collected data can be tagged, filtered, and/or processed as desired, and the original and/or processed status data is stored in the database 155 for reporting, user, queries, and/or other actions as appropriate. Other embodiments may include other processing modules in addition to those illustrated in FIG. 1, and/or may provide the various features and functions described herein using different (but equivalent) arrangements of processing modules and features, as desired.

Figure 3:
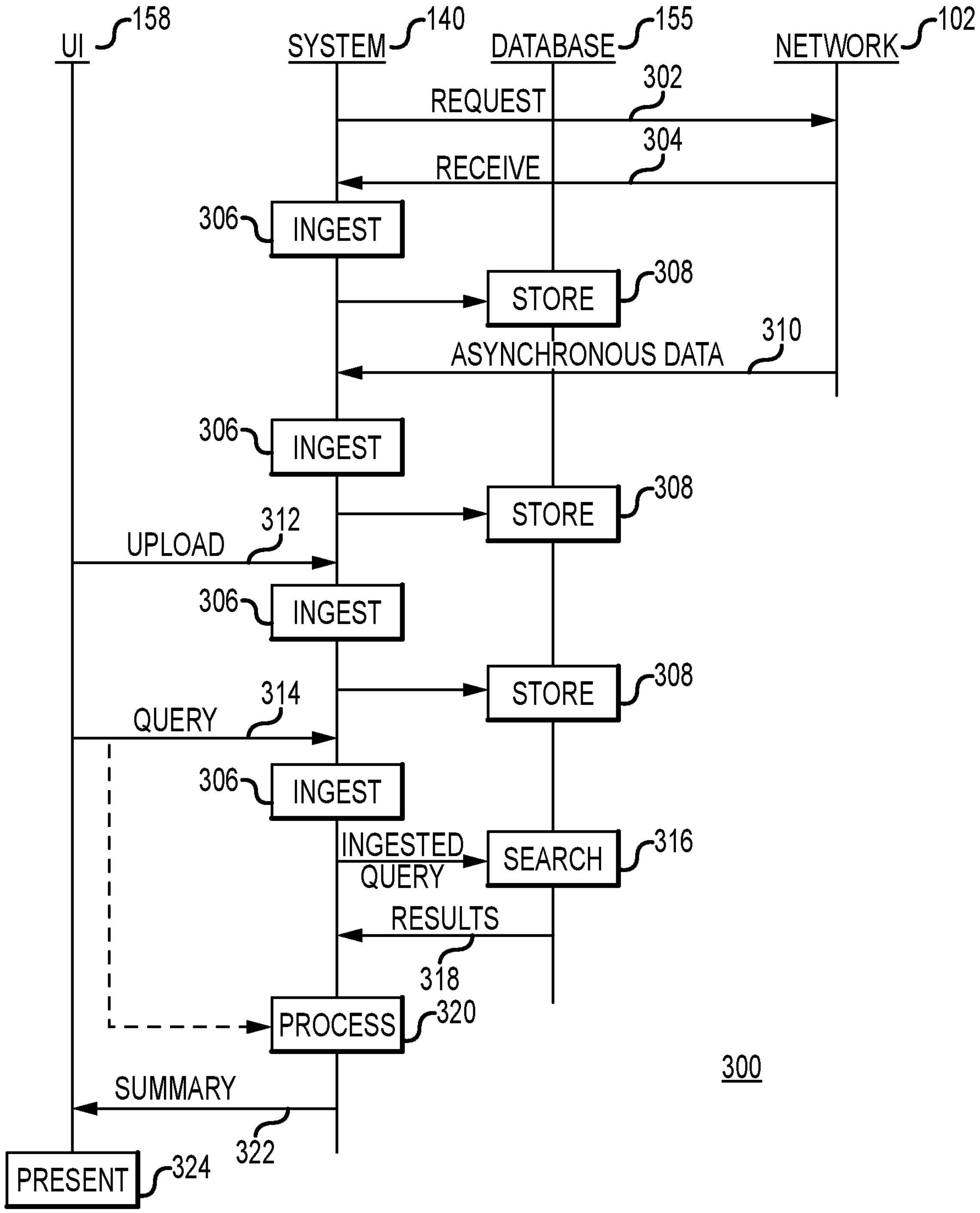
FIG. 3 is a flow diagram illustrating an example of an automated process to determine status summaries related to a wireless network.

FIG. 3 is a flow diagram illustrating one example of an automated process 300 performed by a data management system 140 and/or other components of a wireless network system 100 to provide network status summaries responsive to one or more queries. The various functions shown in FIG. 3 may be distributed amongst the various components of system 100 in any manner, and different embodiments may organize the processing of various features in any number of different ways. In some examples, the data management system 140 performs the data collection, processing, data storage, and reporting functions.

Process 300 suitably includes the broad functions of obtaining status data, processing the status data using a machine learning model (MLM), receiving a user query, processing the user query using a MLM, retrieving relevant processed status data from the database 155, processing the retrieved data using a MLM, and presenting the processed data as a query result to the user. The one or more MLMs of the MLM system may be trained to convert human natural language input to a data store query language (e.g., database query, knowledge base query, vector store query, etc.) and to formulate a natural language or other formatted response to the user query. Reference to a MLM herein may be understood to include combinations of more than one MLM.

As described above, in some embodiments, the data management system 140 may use a machine learning (ML) model, or MLM system having one or more machine learning models (MLMs), each for example trained based on a machine learning algorithm, to perform status data embedding and embedding of user queries, to understand user queries, to format and generate responses to user queries, or the like. A ML algorithm may comprise a procedure run on a training data set to create a ML model, and a ML model may be configured to receive new input data and generate an estimation, prediction, classification, response, vector, or the like for the new input data. An ML model may also be referred to as an AI (artificial intelligence) model.

The MLM system, which may include multiple MLMs and may be configured to use the MLMs in connection with each other (e.g., using supporting processes), may be stored in the memory of the data management system 140. The supporting processes may include, for example, automated routines to perform functions that facilitate providing input to and managing output from a MLM, including filtering, formatting, database 155 access, or the like. The MLM and/or MLM system may include an application programming interface (API) which may be used by the data management system 140 and/or the MLM system for transferring data, processing status data, user queries, output results, and the like. The data management system 140 processor may execute operating routines including the MLMs, and may generate actions and output based on one or more of the received status data, user queries, or the like. In some embodiments, the MLMs may comprise suitable ML models for creating vector embeddings from input data/queries (an embedding model), language models for understanding queries and formatting responses, or the like.

The ML algorithm(s) for the ML models discussed herein may be implemented on any suitable computing system. In some embodiments, the data management system 140 may be configured to perform the ML algorithm. In some embodiments, a separate computing system may be configured to perform the ML algorithm. The ML algorithm may be configured to construct and/or retrain a MLM based on the training data set. The training data set may comprise example inputs and their actual outputs (e.g., vector embedding, query and expected response, etc.). Some generated MLMs can map the inputs to the outputs based on the provided training set. The MLM may be updated over time, for example as the training data set becomes larger, is improved, as the number of user queries and responses increases (e.g., with corresponding feedback), or is otherwise updated. As the network 102 evolves, the MLMs of the MLM system may be retrained from time to time to increase accuracy of the generated responses, to alter response format, or the like. In some embodiments, the data management system 140 may be provided with the updated MLMs from time to time.

The ML algorithm may be configured to perform machine learning using various methods, such as decision tree learning, associates rule learning, artificial neural networks, deep learning, convolutional neural networks, recurrent artificial neural networks, long short term memory neural networks, inductive logic programming, support vector machines, clustering, random forest, Bayesian networks, reinforcement learning, supervised/unsupervised learning, representation learning, similarity and metric learning, sparse dictionary learning, genetic algorithms, k-nearest neighbor (KNN), among others.

As described above, the one or more ML algorithms are configured to perform a particular task, for example training a MLM to create a vector embedding for obtained status data and/or a user query (for retrieving closest results), determine a human-like/readable response to a user query based on retrieved data from the database, and the like. The tasks for which the MLMs are trained may vary based on, for example, the type of network 102, the number and type of network components, the anticipated amount of status data, tradeoffs between accuracy and speed in determining output, and so on.

The MLM system may include any suitable MLM to process large quantities of past (historical) and/or present data and identify (classify, categorize, etc.) patterns in the data. In some embodiments, the MLM system may include a large language model (LLM) that can perform natural language processing tasks such as summarizing data and text and answering user queries by generating a natural language response. In some embodiments, the MLM system may include an embedding model (EM) that converts status data (in its various forms) and user queries into a numerical representation of the status data, for example vector(s) of numbers reflecting its semantic meaning and creating a unique identifier for a particular obtained status data. Exemplary embedding models may assign such identifiers to any type of status data, whether text, numerical data points, image, or the like. Embedding models may support a semantic search of the status data. The distance between vectors of status data and/or queries can measure the relationship between the various data and/or queries, and a similarity search may be performed on the vector store to find the closest results to an embedded (e.g., vectorized) query, for example.

The data management system 140 may obtain (e.g., receive) status data according to several different methods. Referring back to FIG. 3, the data management system 140, at step 302, may request, for example via its network interface, status data from one or more network components or otherwise related to the network 102. In some embodiments, the request 302 may include requesting status data from one or more DUs, CUs, and/or RUs associated with one or more cell sites of the network 102. At step 304, the data management system 140 may receive status data, for example via the network interface, according to the request 302. The data management system 140 may continue to repeat steps 302 and 304, for example at a predetermined interval of time (e.g., a predetermined time period), and may perform steps 302 and 304 for different status data at different time intervals.

The data management system 140 may, at step 310, additionally or alternatively receive unrequested status data from one or more network 102 components or otherwise related to the network 102. Such status data may include streamed status data, alerts from a network 102 component (e.g., cell site power outage), triggered events/data, status updates, configuration details, and the like, according to other suitable processes. For example, the network system 100 may be configured to send a status data document such as a site closeout package document to the data management system 140 upon its receipt by the network system 100, may be configured to send scheduled outage information when such information is updated, and the like. The received 310 unrequested status data may be asynchronous such that it is not synchronized with a predetermined time period or interval for receiving status data, and not in response to a specific data request.

The data management system 140 may, at step 312, receive status data via the UI 158. The UI 158 may include a mechanism for a user or other entity to upload status data to the data management system 140. In some embodiments, the UI 158 may comprise a browser interface with an "UPLOAD" button or the like that, when activated by a user, allows the user to browse for a document or other file to upload or otherwise transfer 312 to the data management system (referred to herein as a status data document). For example, a user may upload 312, by the UI 158, a site closeout package document, historical information not previously obtained by the data management system 140, upcoming outage information, root cause analysis information (e.g., data related to determined causes of analyzed prior issues), or the like to the data management system 140. The UI 158 may include a call to an API of the MLM system for transferring such data.

After obtaining status data by any combination of steps 302, 304, 310, and 312, the data management system 140 may ingest 306 the obtained status data. The data management system 140 may temporarily locally store the obtained status data prior to ingesting the data. After receiving 304 status data in response to a request 302, the data management system 140 may, at step 306, ingest the obtained status data. After receiving 310 status data unrequested from the network 102, the data management system 140 may, in a step 306, ingest the obtained status data. After receiving 312 status data via the UI 158, the data management system 140 may, in a step 306, ingest the obtained status data.

Ingesting 306 the obtained status data may comprise processing the status data to a form suitable for use with the database 155 and/or another MLM of the MLM system. For example, ingesting 306 may comprise formatting, tagging, filtering, and other suitable processes for storing the status data in the database 155 for later use by the data management system 140 and its attendant processes. In some embodiments, ingesting 306 may comprise formatting the status data in a comma separated variables, text, spreadsheet, or other suitable format for storage and retrieval based on a query/search input to the database 155. In some embodiments, ingesting 306 may comprise preprocessing the status data prior to providing the status data to a machine learning model or machine learning model system. The preprocessing may comprise converting the status data to a comma separated values format, spreadsheet, or any other suitable manipulation prior to being operated upon by a MLM.

Ingesting 306 the obtained status data may comprise processing the status data with a MLM, for example at least one MLM of a MLM system. In some embodiments, the obtained status data may be ingested 306 by providing it to an embedding model to create one or more vector embeddings of the obtained status data. In some embodiments, the obtained status data may be provided to a MLM trained for classification, pattern recognition, or the like. The data management system 140 may use an API of the MLM/MLM system to perform the ingesting 306.

The data management system 140 may store, at step 308, the ingested 306 obtained status data in any suitable data store. For example, the data management system 140 may store the ingested 306 status data in the database 155. In some embodiments, the data management system 140 ingests 306 the status data using an embedding model, and then stores 308 the ingested status data (e.g., in the form of embedding vectors) in the database 155 comprising a vector database. The data management system 140 may also store 308 the original and/or preprocessed status data in the database 155, such that the database 155 stores both the ingested 306 status data as well as the pre-MLM status data. While described as separate steps herein, in some cases ingesting 306 the status data includes storing the ingested status data. The database 155 may be part of the MLM system or may be separate therefrom.

The data management system 140 may, at step 314, receive a user query, for example via the UI 158. The UI 158 may comprise a mechanism, such as a text insertion box or the like, for accepting the user query and transmitting it to the data management system 140. The UI 158 may call an API of the MLM system to transfer the user query. A user query may take any suitable form. By way of non-limiting examples, a user query may be "How has the power level changed on cell site 1234 over the past 24 hours," "how is the RU at cell site 1234 performing compared to when it was first closed out," "Traffic data trend over the past month," "how many cell sites have been configured by the OSS," "show me the data centers with the highest latency," "Cell sites with the worst issues currently," and "which cells sites are likely to suffer an outage next," among numerous other possible queries.

After receiving the user query 314, the data management system 140 may ingest 306 the user query using the same MLM used to ingest 306 the obtained status data. Ingesting the user query may comprise converting it to the proper format to retrieve relevant information from the database 155. In some embodiments, the MLM may create vector embeddings for the user query. The data management system 140 may store 308 the user query vector embeddings, and may store the original user query, in the database 155.

The data management system 140 may perform or otherwise initiate a search 316, for example via the EM, using the database 155 (e.g., as a knowledge base relating to the network 102). In some embodiments, the search 316 may comprise a semantic search of the embedded user query, for example finding the closest embeddings (e.g., closest vectors) in the database 155 using any suitable method. The search results returned to the data management system 140 at step 318 may include an identification of the closest items in the database 155 to the user query. In some embodiments, the received results 318 may include a priority or ranking of closeness of each result to the user query. In some embodiments, the data management system 140 may also receive 318 the original obtained status data (possibly with corresponding tags, timestamps, etc.)

associated with each result, to provide context for further processing of the search results. In some cases, the original obtained status data in its various forms becomes the context for a LLM of the MLM system to generate a response to the query, as described next.

At step 320, the data management system 140 may, via the MLM system, process the received search results from step 318 into a human-readable form, for example generating a summary of the retrieved results. In some embodiments, the data management system 140 may use a LLM to process 320 the results 318 using the ranked search results and corresponding obtained status data (as context). The LLM or similar language model may be trained according to any suitable ML algorithm, for example to produce sentence-like responses to the user query 314, to produce tabular results, comma separated variable files, spreadsheets, graphs, and/or the like. In some embodiments, the MLM determines results in different formats according to the user query, for example returning tabular results in response to a query regarding performance over a time period, returning a sentence in response to a query regarding the status of a particular network component, or the like. The MLM (e.g., LLM), at step 320, may determine its output (e.g., response) based on both the received search results 318 as well as the user query 314. By way of simple example, a response 320 to the query "how is the RU at cell site 1234 performing compared to when it was first closed out" might use the site closeout document for cell site 1234 and relevant recent performance data as context in determining the response (assuming these are the data points that are provided 318 from the search)

At step 322, the data management system 140 may provide the determined MLM output from step 320 to the UI 158 as a summary or other analysis of the relevant search results 318 corresponding to the user query 314. The UI 158 at step 324 may display, present, or otherwise report determined output. In some embodiments, the UI 158 may provide a dashboard to the user.

Alerts (e.g., text message or email alerts) can be generated based upon one or more status data values passing a threshold, in response to detected or determined cell site issues, or other important events occurring within network 102, and/or based upon any other factors. Any number of electronic outputs may be provided for display, publication and/or messaging, as desired. In some embodiments, the summary 322 may be used to generate alerts, notifications, or the like.

A query and response process (e.g., including steps 316, 318, and 320) may be initiated by the data management system 140 in response to a received user query, for example as described above. In some embodiments, the query and response process may be initiated by an automated process (e.g., comprising software routines executed by a processor) sending a predetermined search request on a regular or irregular predetermined schedule, in response to an alert, trigger, or other summary 322 result, or the like. In some embodiments, the automated query and response process may be used to generate and store (e.g., in a database or other memory associated with database 155 or separate therefrom) a series of particular status updates, for later retrieval by an operator of the network system 100, for analyzing trends over time (which may be automated and may be interpreted by another MLM), or the like.

Various embodiments therefore provide a data management system that can obtain and aggregate status data (in a variety of formats) regarding numerous aspects of a network 102 and its various components, process the data according to a MLM system, and generate appropriate and accurate results in response to unstructured user queries regarding any such aspect of the network 102. In contrast to prior systems that were unable to process "big picture" or other unstructured analysis due to disparate types of status data and limited predefined dashboard reporting fields, systems and methods as described herein permit much more sophisticated and flexible analysis and reporting than was previously available for such wireless networks. Systems and methods as described herein allow integration of a wide variety of relevant information not previously combinable for a 5G network. This allows for a complete understanding of network status, thereby improving identification and correction/prevention of issues, network functionality, and the like. Other embodiments may provide additional benefits and features, as desired.

Each of the various features and systems described herein may be implemented in software and/or firmware that resides in non-transitory data storage for execution by one or more processors to perform the various automated processes described herein.

The general concepts set forth herein may be adapted to any number of alternate but equivalent embodiments. The term "exemplary" is used herein to represent one example, instance or illustration that may have any number of alternates. Any implementation described herein as "exemplary" is not necessarily to be construed as preferred or advantageous over other implementations, nor is it necessarily intended as a model that must be duplicated in other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. An automated process performed by a data management system associated with a wireless network having a plurality of network components associated with a plurality of cell sites, the data management system comprising a processor and an interface to the wireless network, the automated process comprising:

obtaining, via the network interface, a plurality of status data from the plurality of network components, wherein the plurality of network components comprises at least one each of a radio unit (RU), a distributed unit (DU), and a centralized unit (CU) associated with at least one of the plurality of cell sites;

ingesting the obtained status data, comprising processing the obtained status data with a machine learning model (MLM) system to generate a transformed representation of the obtained status data, wherein the transformed representation comprises numerical vector embeddings created from the obtained status data by an embedding model (EM) of the MLM system, and wherein the obtained status data comprises status data in multiple formats;

storing the transformed representation of the obtained status data in a data store;

obtaining a site closeout package document for a first cell site of the plurality of cell sites, wherein the site closeout package document comprises a network component test result at a time of installation of the network component at the first cell site;

ingesting the obtained site closeout package document using the MLM system;

storing the ingested site closeout package document in the data store;

receiving, via a user interface of the data management system, a user query related to the network;

ingesting the received user query using the MLM system;

retrieving a status data result corresponding to the ingested query from the data store using the MLM system;

generating, using the MLM system, a summary of the retrieved status data result; and presenting the generated summary via the user interface.

2. The automated process of claim 1, wherein the RU status data, DU status data, and CU status data are repeatedly obtained and ingested at a predetermined time interval.

3. The automated process of claim 2, wherein the RU status data, DU status data, and CU status data are obtained asynchronously from receiving the user query.

4. The automated process of claim 2, wherein the obtained status data comprises a RU health check, a DU health check, and a CU health check.

5. The automated process of claim 3, further comprising:

receiving, via the user interface, a status data document;

ingesting the status data document using the MLM system; and storing the ingested status data document in the data store.

6. The automated process of claim 1, wherein generating the summary comprises using, by the MLM system, the ingested site closeout package document and post-installation network component status data as context.

7. The automated process of claim 1, wherein:

the MLM system comprises a large language model (LLM);

the data store comprises a vector database;

storing the transformed representation of the obtained status data in the data store comprises storing the vector embeddings in the vector database; and the LLM generates the summary of the retrieved status data result based on the user query and a context corresponding to the retrieved status data result.

8. The automated process of claim 7, wherein the LLM is trained to summarize the retrieved status data result as a table.

9. The automated process of claim 1, further comprising:

storing an original obtained status data in the data store, wherein the original obtained status data comprises the obtained status data prior to the processing of the obtained status data with the MLM system; and wherein generating the summary comprises using, by the MLM system, the original obtained status data and the ingested status data as context.

10. The automated process of claim 1, wherein the obtained status data includes information required for a sleepy cell detection process and an output of the sleepy cell detection process for at least one of the plurality of cell sites.

11. A data management system comprising a processor, non-transitory storage, and an interface to a wireless network having a plurality of network components associated with a plurality of cell sites, wherein the non-transitory storage comprises computer-executable instructions that, when executed by the processor, perform an automated process that comprises:

obtaining, via the network interface, a plurality of status data from the plurality of network components, wherein the plurality of network components comprises at least one each of a radio unit (RU), a distributed unit (DU), and a centralized unit (CU) associated with at least one of the plurality of cell sites;

ingesting the obtained status data, comprising processing the obtained status data with a machine learning model (MLM) system to generate a transformed representation of the obtained status data, wherein the transformed representation comprises numerical vector embeddings created from the obtained status data by an embedding model (EM) of the MLM system, and wherein the obtained status data comprises status data in multiple formats;

storing the transformed representation of the obtained status data in a data store;

obtaining a site closeout package document for a first cell site of the plurality of cell sites, wherein the site closeout package document comprises a network component test result at a time of installation of the network component at the first cell site;

ingesting the obtained site closeout package document using the MLM system;

storing the ingested site closeout package document in the data store;

receiving, via a user interface of the data management system, a user query related to the network;

ingesting the received user query using the MLM system;

retrieving a status data result corresponding to the ingested query from the data store using the MLM system;

generating, using the MLM system, a summary of the retrieved status data result; and presenting the generated summary via the user interface.

12. The data management system of claim 11, wherein the RU status data, DU status data, and CU status data are repeatedly obtained and ingested at a predetermined time interval.

13. The data management system of claim 12, wherein the RU status data, DU status data, and CU status data are obtained asynchronously from receiving the user query.

14. The data management system of claim 12, wherein the obtained status data comprises a RU health check, a DU health check, and a CU health check.

15. The data management system of claim 13, wherein the automated process further comprises:

receiving, via the user interface, a status data document;

ingesting the status data document using the MLM system; and storing the ingested status data document in the data store.

16. The data management system of claim 11, wherein generating the summary comprises using, by the MLM system, the ingested site closeout package document and post-installation network component status data as context.

17. The data management system of claim 11, wherein:

the MLM system comprises a large language model (LLM);

the data store comprises a vector database;

storing the transformed representation of the obtained status data in the data store comprises storing the vector embeddings in the vector database; and the LLM generates the summary of the retrieved status data result based on the user query and a context corresponding to the retrieved status data result.

18. The data management system of claim 11, wherein the automated process further comprises:

storing an original obtained status data in the data store, wherein the original obtained status data comprises the obtained status data prior to the processing of the obtained status data with the MLM system; and wherein generating the summary comprises using, by the MLM system, the original obtained status data and the ingested status data as context.

19. An automated process performed by a data management system associated with a wireless network having a plurality of network components associated with one or more cell sites, the data management system comprising a processor and an interface to the wireless network, the automated process comprising:

periodically obtaining, via the network interface, a plurality of status data from a subset of the plurality of network components;

ingesting the obtained status data, comprising processing the obtained status data with a machine learning model (MLM) system to generate a transformed representation of the obtained status data, wherein the transformed representation comprises numerical vector embeddings created from the obtained status data by an embedding model (EM) of the MLM system, and wherein the obtained status data comprises status data in multiple formats;

storing the transformed representation of the obtained status data in a data store;

obtaining a site closeout package document for a first cell site of the one or more cell sites, wherein the site closeout package document comprises a network component test result at a time of installation of the network component at the first cell site;

ingesting the obtained site closeout package document using the MLM system;

storing the ingested site closeout package document in the data store;

receiving an automated query related to the network;

ingesting the received automated query using the MLM system;

retrieving a status data result corresponding to the ingested automated query from the data store using the MLM system;

generating, using the MLM system, a summary of the retrieved status data result; and storing the generated summary in a second database.

20. The automated process of claim 19, further comprising:

receiving and ingesting a user query;

retrieving a status data result corresponding to the ingested user query using the MLM system; and generating, using the MLM system, a summary of the retrieved status data result.

* * * * *